United States Patent [19]

Rayfield

[11] Patent Number: 4,734,717

[45] Date of Patent: Mar. 29, 1988

[54] INSERTABLE, MULTI-ARRAY PRINT/CARTRIDGE

[75] Inventor: Wilson P. Rayfield, Centerville, Ohio

[73] Assignee: Eastman Kodak Company, Rochester, N.Y.

[21] Appl. No.: 945,135

[22] Filed: Dec. 22, 1986

[51] Int. Cl.[4] .................. G01D 15/16

[52] U.S. Cl. .................. 346/140 R; 400/126; 400/175

[58] Field of Search .................. 346/140; 400/126, 175

[56] References Cited

U.S. PATENT DOCUMENTS

| | | | |
|---|---|---|---|
| 4,329,698 | 5/1982 | Smith | 346/140 |
| 4,364,067 | 12/1982 | Koto | 346/140 |
| 4,500,895 | 2/1985 | Buck et al. | 346/140 R |
| 4,611,219 | 9/1986 | Sugitani | 346/140 |
| 4,628,334 | 12/1986 | Dagna | 346/140 |

OTHER PUBLICATIONS

Siewell et al; The Thinkjet Orifice Plate: A Part with Many Functions, H-P Journal, vol. 36, No. 5, May 1985; pp. 33-37.

*Primary Examiner*—Joseph W. Hartary

*Attorney, Agent, or Firm*—John D. Husser

[57] ABSTRACT

For use in ink jet printing apparatus, an insertable print-/cartridge having an ink reservoir, at least two linear arrays of drop generating elements located in a parrallel relation, a support for coupling the ink reservoir and driver arrays and an orifice plate comprising a plurality of linear orifice arrays aligned in spaced relation over respective drop generating arrays. The orifice plate is an integral photofabricated element wherein the linear patterns formed by the orifice arrays are precisely parallel and have a precise predetermined spacing therebetween.

10 Claims, 8 Drawing Figures

INSERTABLE, MULTI-ARRAY PRINT/CARTRIDGE

BACKGROUND OF THE INVENTION

1. Field of the Invention

The present invention relates to insertable print/cartridges for use in drop-on-demand ink jet printing systems and more particularly to print/cartridge constructions which provide a plurality of precisely aligned orifice arrays that can be insertably positioned, in precise printing orientation, within a cooperative printer.

2. Background Art

Commonly assigned and concurrently filed U.S. patent application Ser. No. 945,136, entitled "Ink Jet Printer for Cooperatively Printing with a Plurality of Insertable Print/Cartridges", by M. Piatt describes a highly useful approach for ink jet printing with a plurality of insertable print/cartridges. In general, that approach employs the physical positioning of each inserted print/cartridge so that its linear orifice array is aligned: (i) precisely perpendicular to the direction of line traverse, (ii) at a precise predetermined distance from a reference surface parallel to the direction of line traverse and (iii) at a generally predetermined spacing from the printing zone. This aspect of the Piatt approach prevents printing artifacts caused by misalignments of the cooperative print/cartridges in the vertical page direction. To prevent artifacts due to misalignments along the horizontal page direction, the Piatt approach utilizes detections of the relative transverse locations of the linear orifice arrays of inserted print/cartridges and coordination of the print/cartridges printing actuations based on such detections. Commonly assigned U.S. patent application Ser. No. 945,134, entitled "Multiple Print/Cartridge Ink Jet Printer Having Accurate Vertical Interpositioning", and concurrently filed in the names of Piatt, Houser and McWilliams, describes particularly preferred systems for attaining the above-described physical positioning of insertable print/cartridges. Commonly assigned U.S. patent application Ser. No. 945,137, entitled "System for Determining Orifice Interspacings of Cooperative Ink Jet Print/Cartridges", and concurrently filed in the names of Piatt, Theodoras and Ray, describes highly useful systems for scanning inserted print/cartridges and computing and storing the relative transverse locations of the orifice arrays thereof to enable coordination of the drop placements during line printing traverses.

The ink jet printing systems described in the above-noted applications provide significant advantages for using a plurality of insertable print/cartridges. However, for certain applications it would be desirable to reduce the printer size that is required by such a multiple print/cartridge approach. Also, it would be desirable to reduce the printer complexities connected with the approach's scan-detection of the separate print/cartridges.

SUMMARY OF INVENTION

One significant purpose of the present invention is to provide insertable print/cartridge constructions which afford many of the advantages of the above-mentioned, multiple print/cartridge approach, while reducing the printer size and complexity associated with this approach.

In one aspect the present invention provides multi-array print/cartridge constructions which can be readily inserted into precise printing position to provide enhanced resolution printing capabilities.

In another aspect the present invention provides multi-array print/cartridge constructions which can employ different color or different shade (i.e. density) inks in a cooperative line printing operation.

In one preferred embodiment the present invention constitutes, for use in ink jet printing apparatus, an insertable print/cartridge having an ink reservoir, at least two arrays of drop generating elements, a support for coupling the ink reservoir and driver arrays and an orifice plate comprising at least two orifice arrays aligned in spaced relation over respective drop generating arrays, the orifice plate being an integral photofabricated element wherein the orifice arrays are precisely inter-located. Such orifice plate desirably includes a detent surface, precisely located vis-a-vis the orifice arrays, for precisely locating the orifice plate in relation to the traversing system of an ink jet printer.

In another preferred aspect the print/cartridge comprises a plurality of discrete ink reservoirs and means for forming a plurality of separate capillary ink conduits coupling the ink reservoirs to supply zones between respective orifice arrays and driver arrays. In a preferred embodiment of the invention, the separate ink reservoirs are stacked in the direction of the linear dimension of the orifice arrays.

In a further preferred aspect of the invention, the orifice plate comprises an integrally photofabricated element having at least two linear orifice arrays that are precisely staggered in the direction of their linear dimensions. In a preferred embodiment, the orifice plate also includes an integral, linear, indexing surface located precisely perpendicular to the linear patterns of the orifice arrays.

BRIEF DESCRIPTION OF THE DRAWINGS

The subsequent description of preferred embodiments refers to the attached drawings wherein.

DETAILED DESCRIPTION OF PREFERRED EMBODIMENTS

Figure 1:
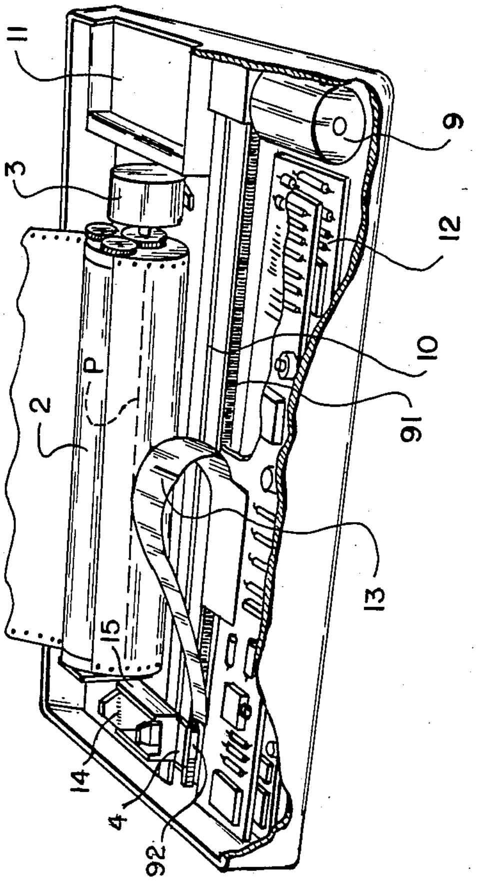
FIG. 1 is a perspective view, with cover portions removed, of one printer embodiment with which the present invention is useful.

The ink jet printing apparatus shown in FIG. 1 in general comprises a print medium advancing platen 2 which is adapted to receive sheet or continuous print material, e.g. paper, from an ingress at the lower rear, and under the drive from motor 3, advance successive line portions of the medium past a print zone P, and out of the printer through a printer egress in the top of the printer. During the passage of successive line portions through the print zone, print/cartridge carriage 4 is traversed across the print zone so that a print/cartridge placed in the carriage nest 5 can effect printing operations, as subsequently described. The carriage 4 is slidingly mounted on a guide rail means 65 (see FIG. 4) located beneath the print/cartridge nest 5 and a carriage drive motor 9 effects traversing movement of the carriage 4, past the platen face, via an endless cable 10 attached to carriage 4. The printer is electrically energized, e.g. from a battery or DC power source 11, via a control circuit means 12. Electrical energy is supplied to an inserted print/cartridge by means of a ribbon cable 13 which has terminals 14 in the lower portion of nest 5.

Figure 2:
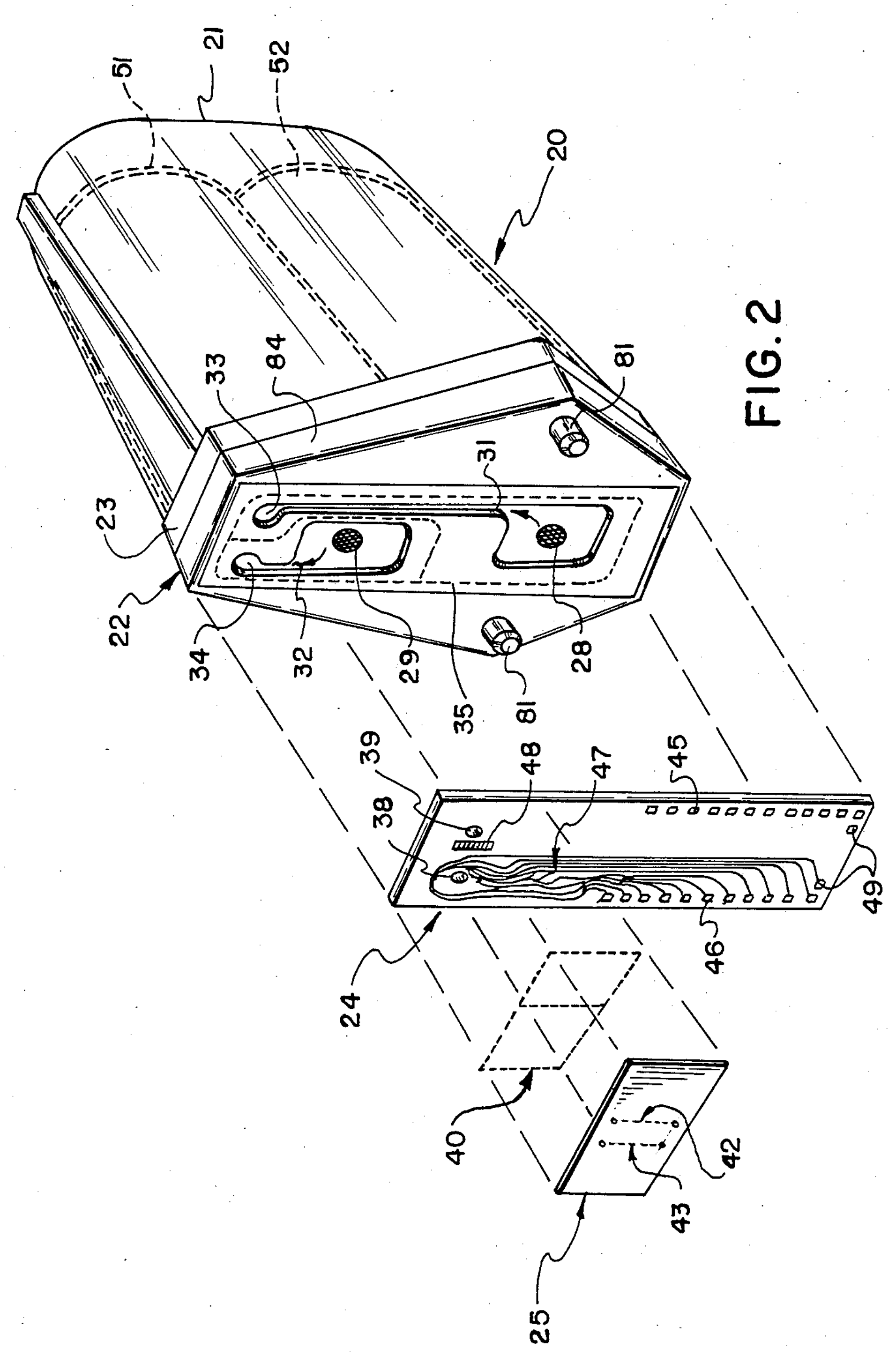
FIG. 2 is an exploded perspective view of one preferred print/cartridge construction in accord with the present invention.

Referring now to FIG. 2, there is shown one preferred multi-array print/cartridge 20 in accord with the present invention. In general, print/cartridge 20 includes an ink supply housing 21, a cap member 22 which interfits with a top portion 23 of the housing 21, a driver plate assembly 24 which is mounted upon cap member 22 and an orifice plate 25 which is mounted on the driver plate assembly 24. The general configuration just described has heretofore been utilized in thermal ink jet printing with a single ink supply and a single linear orifice array.

In accord with the present invention, the print/cartridge 20 is constructed to provide two separate ink supplies respectively for printing through two discrete linear orifice arrays. More specifically, within the housing 21 are two separate silicone rubber bladders 51, 52 which are adapted to contain separate ink supplies and collapse as emptied. The top portions of the bladders have openings whose peripheries are clamped between top 23 and cap 22 in a manner which seals the ink within the reservoirs from escape, except for egress respectively through supply openings 28, 29 through cap member 22. Each of the openings 28 and 29 have a filter element therein and the openings lead respectively to capillary supply passages 31, 32 formed in the top of cap 22. Thee supply passages can be molded in the cap top and terminate at egress reservoirs 33 and 34.

Driver plate 24 is affixed to the cap member 22, e.g. by an epoxy adhesive printed along the dotted lines 35 shown in FIG. 2; and the bottom surfaces of the driver plate assembly that cover these passages, cooperate to provide for capillary tranpsort of ink from the bladders to the egress reservoirs 33, 34. The driver plate has two capillary openings 38, 39 that are aligned with the egress reservoirs to allow ink to pass therethrough into discrete ejection zones, formed between top surfaces of driver plate 24 and bottom surfaces of attached orifice plate 25. As schematically illustraed by dotted lines 40, another printed epoxy coating both adheres the orifice plate and forms edge enclosures which maintain the separation of the inks from the different reservoirs. The orifice plate 25 has spaced linear orifice arrays 42 and 43 which are respectively in comunication with the discrete ink ejection zones defined by epoxy barriers 40.

The driver plate 24 comprises two drop generation systems respectively adapted for the on demand ejection of drops from the linear orifice arrays 42, 43. More specifically, each generation system comprises a plurality of connector pads 45, 46 having respective electrical leads 47 (schematically illustrated only on the left half of the driver plate) that are respectively coupled to a plurality of discrete resistive heating elements 48 (schematically illustrated only on the right half of the driver plate). That is, there is a heating element located beneath each orifice of the attached orifice plate and each heating element has an electrical power lead 47 and is also coupled to a common ground terminal pad 49. Various detail constructions for forming such thermal ink jet (or bubble jet) drop generator elements are known in the art. In general each sub-cicruit responds to an electrical pulse addressed to its terminal (by the printer) to cause heating of the ink between its resistive element and its related orifice to cause an ink droplet to be ejected through the related orifice. In accord with one aspect of the present invention, the resistive heating elements of print/cartridge 20 can be arranged in parallel line arrays respectively under the linear orifice arrays 42, 43 of orifice plate 25.

Figure 3:
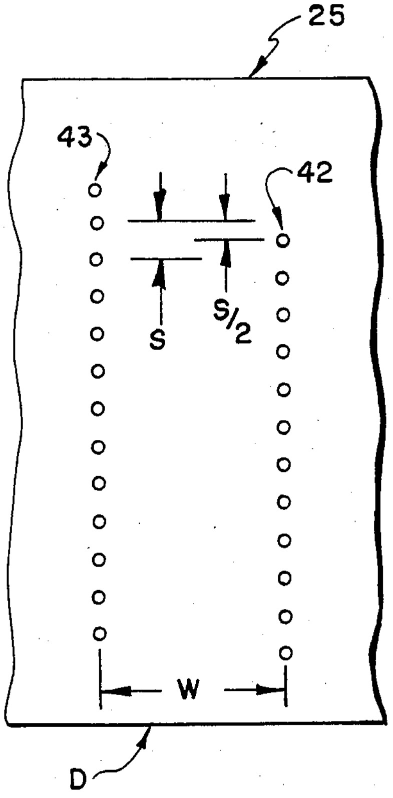
FIG. 3 is an enlarged view of a portion of the orifice plate of the print/cartridge shown in FIG. 2.

Referring now to FIG. 3, one preferred construction for orifice array 42 and 43 is shown in more detail. Thus, orifice array 42 includes twelve orifices that are equidistantly spaced in a linear pattern and orifice array 43 includes twelve orifices that are equidistantly spaced in another linear pattern that is precisely parallel to the line pattern of array 42. The linear arrays 42, 43 are spaced apart a precise distance "W" whereby the printing control system of the printer, in which the print/cartridge 20 is received, can effect drop placements accurately, in the transverse print line dimension, without the necessity of a scan detection for determining the precise transverse interspacing between orifice arrays. In accord with one preferred embodiment of the present invention, the linear arrays can be staggered in the direction of their linear pattern to provide an interlaced print output that doubles the resolution attainable by a single printing pass. Thus, there is a predetermined center-to-center orifice spacing, e.g. "S" as indicated in FIG. 3, and the orifice of array 42 is located downwardly by the amount S/2 from its counterpart orifice array 43. By this construction each orifice of array 42 is precisely interlaced, midway between in the vertical direction, with respect to an adjacent pair of orifices of array 43. FIG. 3 also illustrates that the orifice plate 25 includes a linear indexing edge D formed precisely perpendicular to the lines of orifice arrays 42 and 43. This orifice plate structure enables the orifice arrays to be precisely oriented perpendicular to the direction of carriage traverse, as will be described subsequently with reference to FIGS. 4–8

In accord with one preferred construction of the present invention, orifice plate 25 is an integral element that is electroformed upon a photoresist pattern in a manner similar to the procedure described in U.S. Pat. No. 4,184,925. Thus, a photoresist pattern is photofabricated to define the boundary for edge D and the orifice patterns; and a metal, e.g. nickel, is electroplated onto the photoresist pattern to a thickness that extends toward the top of, or slightly above, the photoresist orifice-defining plugs. By virtue of this technique, each orifice can be precisely located as described above, with the proper locational relation to other orifices and to the indexing detent edge D.

Figure 4:
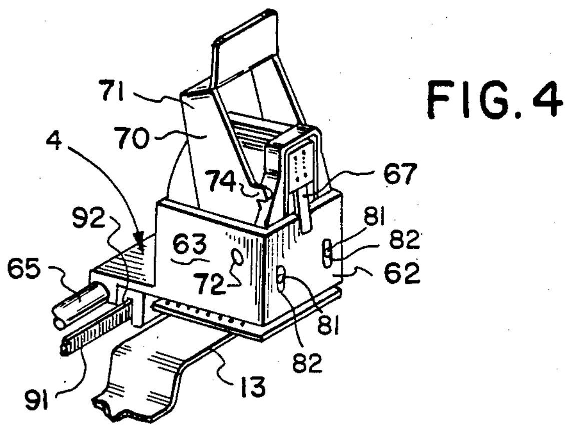
FIGS. 4 and 5 are respectively perspective and front views showing the cooperation of the FIG. 2 print/cartridge with the printer shown in FIG. 1.
Figure 5:
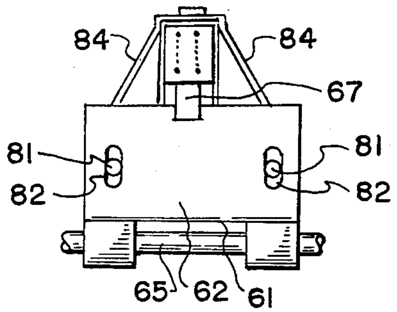
Figure 6:
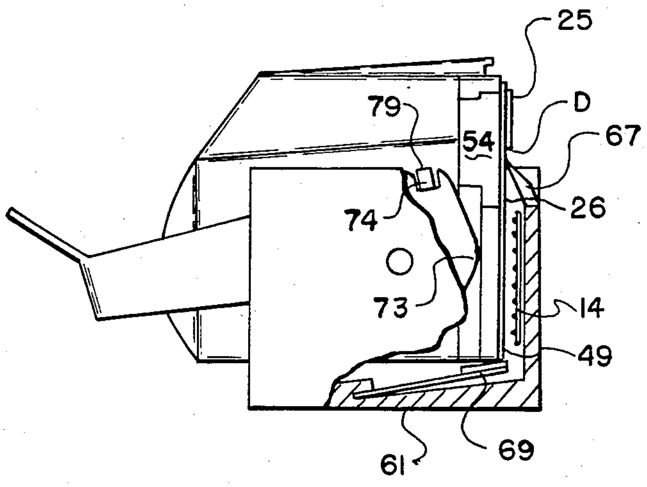
FIGS. 6–8 are enlarged views showing successive stages of the indexing of a print/cartridge constructed in accord with the present invention.

Referring now to FIGS. 4–6, there is shown one preferred device for cooperating with the orifice plate edge D of a print/cartridge 20 to properly orient the linear orifice arrays of such print/cartridge in the printer shown in FIG. 1. Thus, the print/cartridge carriage 4 comprises a bottom wall portion 61, a front wall portion 62 and side wall portions 63 which together form the print/cartridge nest 5, which is adapted to receive and coarsely position a print/cartridge with respect to the printing zone of the printer. The bottom of wall portion 61 is mounted on guide rail means 65 for traversing the carriage across the print zone in a precisely uniform spacial relation to the platen 2 and in a direction substantially parallel to the axis of that platen's axis of rotation. Thus, the direction of the carriage traverse is substantially orthogonal to the direction of print medium advance.

The top of the front wall 62 of print/cartridge nest 5, has, as an upper extension, a knife portion 67, which forms a reference edge that is precisely parallel to the direction of carriage translation and predeterminedly spaced from the linear print zone. Mounted on the outer side walls of the nest of carriage 4 is fastening means 70 for contacting print/cartridges, which have been inserted into nest 5, and moving such print/cartridge into precise operating position in the printer apparatus. Referring to FIG. 6, it can be seen that the fastening means 70 comprises lever arm portions 71, hinge portions 72, camming portions 73 and seating arm portions 74. The bottom wall 61 of the nest 5 also comprises a resilient portion 69 and the fastening means is adapted to move the bottom of an inserted print/cartridge into a forced engagement that downwardly compresses resilient portion 69, when the level arm portion 71 is moved upwardly to the position shown in FIG. 4. When lever arm portion 71 is moved downward, the fastening means 70 is disengaged and the print/cartridge 20 can be hand-lifted from its nest in the carriage 4.

Figure 7:
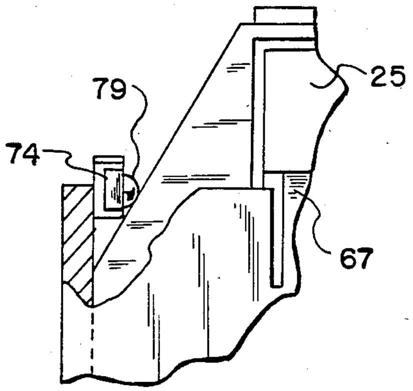
Figure 8:
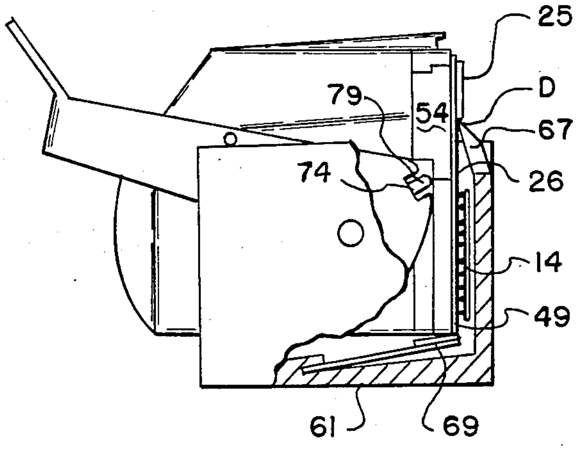

Referring now also to FIGS. 7 and 8, the orifice plate vertical positioning system is designed to provide a predetermined sequence of engagements between the print/cartridge 20 and the carriage 4. First, the print/cartridge is hand-inserted into a coarsely positioned alignment resting loosely in a nest on top of cantilever spring 69. As shown in FIG. 5, positioning lugs 81 of the print/cartridge are located in vertical slots 82. As the fastening means 40 is rotated clockwise (as viewed in FIG. 6), the cam portion 73 first urges the smooth top surface of the driver plate 24 into forced contact with knife edge 67 (see FIG. 6). At this stage the cam dimples 79 on seating arm portions 74 have not yet contacted the print/cartridge sidewalls. During continued rotation the cam dimples 79 contact shoulder portions 84 of an inserted print/cartridge 20 and move the print/cartridge downwardly against the bias of resilient means 69, while cam portion 73 maintains the forward force urging the driver plate 24 into contact with knife edge 67. During this downward movement, knife edge 67 will slide along the face of the driver plate 24 until the surface D of the print/cartridge engages the knife edge. As the engagement between the knife edge 67 and the edge D evolves, the print/cartridge is oriented within the nest so that the edge D is precisely parallel to the knife edge. As noted, the orifice arrays 42 and 43 and the edge D of the orifice plate 25 are photofabricated, and therefore precisely located relative to one another. Thus precise positioning of the orifice plate's edge D relative to the knife edge 67 of the carriage nest precisely locates the printing orifices (rotationally and vertically) relative to the the traversing path of the printer carriage 4, as well as in a predetermined spacial relation vis-a-vis the print zone P.

Continued movement of the lever arm 71 causes cam surface 73 to move connector pads 49 of the print/cartridge into contact with the terminals 14 in the nest bottom (see FIG. 8). To allow continued movement of the fasten means 70, after full detenting of the orifice plate, the seating arms 74 are slightly flexible in an outward direction to allow dimples 79 to slip down the sides of shoulders 84. As shown best in FIG. 7, the thickness of cantilever seating arm 74 behind dimple 79 is less than the other portions of the fastening means 70 to allow this outward movement. The knife edge 67 can yield slightly to the right (as viewed in FIG. 6) to allow firm contact between the cartridge pads 49 and the nest terminals 14.

The particular print/cartridge positioning structure shown in the drawings and described above as well as other preferred physical positioning embodiments, is the subject of U.S. application Ser. No. 945,134, filed concurrently in the names of Piatt, Houser and McWilliams and entitled "Multiple Print/Cartridge Ink Jet Printer Having Accurate Vertical Interpositioning", which is incorporated herein by reference for those teachings. While this physical positioning structure is highly useful, it will be understood that other print/cartridge positioning structures can be used in combination with the present invention.

Referring to FIG. 1 and FIG. 4, it can be seen that the printer also comprises a position detector including an encoder strip 91 extending beneath the print zone and a decoder 92 mounted to print carriage 4. The decoder comprises an emitter and detector (not shown) sandwiching the encoder strip and serves to identify the position of the carriage vis-a-vis the transverse print path. Because the transverse relation of the orifice arrays 42, 44 is precisely controlled by means of fabrication, there is no need to scan detect the print/cartridge to gain that information.

In accord with another feature of the present invention, the ink reservoirs are located in a vertically stacked relation within housing 21. That is, bladder reservoir 51 is stacked on top of bladder reservoir 52, considering the linear direction of the orifice arrays to be a top-bottom direction. By this stacking of the ink reservoirs, in a direction vertically perpendicular to the direction of print/cartridge traverse, the width of the print/cartridge is economized; and this economy translates directly into reduced printer width, which is highly desirable. To enable printing from a common orifice plate with this arrangement of vertically stacked reservoirs, the passages 31, 32 of the cap member 22 are constructed to extend from widely spaced lower and upper supply openings 28, 29 to closely adjacent egress reservoirs 33, 34.

It will be understood by those skilled in the technology, that the features of the present invention providing separate ink supply systems within a single print/cartridge, can be used for various purposes. For example, such constructions can be used to provide different color or different color density inks in a single print/cartridge. Also, the reservoirs 51, 52 can be of different volume, e.g. to supply a black "text" ink and a highlight color ink. In accord with the interlaced orifice array embodiments of the invention (e.g., as illustrated by FIG. 3), a single ink reservoir can be used to supply both orifice arrays. Also, it will be appreciated that other patterns of orifice arrays can be embodied in an integral orifice plate assembly with output logic of the printer programmed according to the particular patterns and precisely known orifice inter-locations.

The invention has been described in detail with particular reference to preferred embodiments thereof, but it will be understood that variations and modifications can be effected within the spirit and scope of the invention.

I claim:

1. For use in ink jet printing apparatus, an insertable print/cartridge having (i) ink reservoir means, (ii) at least two arrays of drop generating elements, (iii) a support for coupling said ink reservoir means and said drop generating arrays and (iv) an orifice plate comprising at least two orifice arrays aligned in spaced relation over respective drop generative arrays, said orifice plate: (a) being an integral element wherein said orifice arrays are precisely inter-located and (b) having an integral indexing surface located precisely with respect to said orifice arrays.

2. The invention defined in claim 1 wherein said reservoir means comprises at least two discrete ink reservoirs and further including means for forming separate capillary ink conduits coupling said discrete ink reservoirs to supply zones between respective orifice array/-drop generating array pairs.

3. The invention defined in claim 2 wherein said discrete ink reservoirs are stacked in the direction of the linear dimension of said orifice arrays.

4. The invention defined in claim 1 wherein said orifice arrays each comprise a plurality of orifices located in a linear pattern and wherein said patterns are parallel with a precisely predetermined spacing therebetween.

5. The invention defined in claim 4 wherein said linear orifice arrays are precisely staggered in the direction of their linear dimensions.

6. The invention defined in claim 5 wherein said orifice arrays are offset in said direction by an amount S/2 where S is the center-to-center spacing of adjacent orifices of each array.

7. For use in ink jet printing apparatus, an insertable print/cartridge having (i) ink resrevoir means, (ii) at least two arrays of drop generating elements located in a parallel relation, (iii) a support for coupling said ink reservoir means and said drop generating arrays and (iv) an orifice plate comprising a plurality of linear orifice arrays aligned in spaced relation over respective drop generating arrays, said orifice plate: (a) being an integral element wherein the line patterns formed by said orifice arrays are precisely parallel and have a precise predetermined spacing therebetween and (b) having an integral, linear, indexing surface located precisely perpendicular to said line patterns of said orifice arrays.

8. The invention defined in claim 7 wherein said linear orifice arrays are precisely staggered in the direction of their linear dimensions.

9. For use in ink jet printing apparatus, an insertable print/cartridge comprising: (a) ink reservoir means, (b) two linear arrays of drop generating elements located in a parallel relation, (c) means for coupling said ink reservoir means and said drop generating arrays and (d) an orifice plate mounted over said drop generating arrays and comprising two linear arrays of uniformly spaced orifices aligned with respective drop generating elements, said orifice plate being an integral element wherein the linear patterns formed by said orifice arrays: (i) are precisely parallel, (ii) have a precise predetermined spacing therebetween and (iii) are precisely staggered in the direction of their linear dimensions by a distance S/2 where S is the center-to-center spacing of adjacent orifices of each array and wherein said orifice plate includes an integral, linear, indexing surface located precisely perpendicular to said linear patterns of said orifice arrays.

10. The invention defined to claim 9 wherein said orifice plate includes an integral, linear, indexing surface located precisely perpendicular to said line or patterns of said orifice arrays.

* * * * *